UNITED STATES PATENT OFFICE.

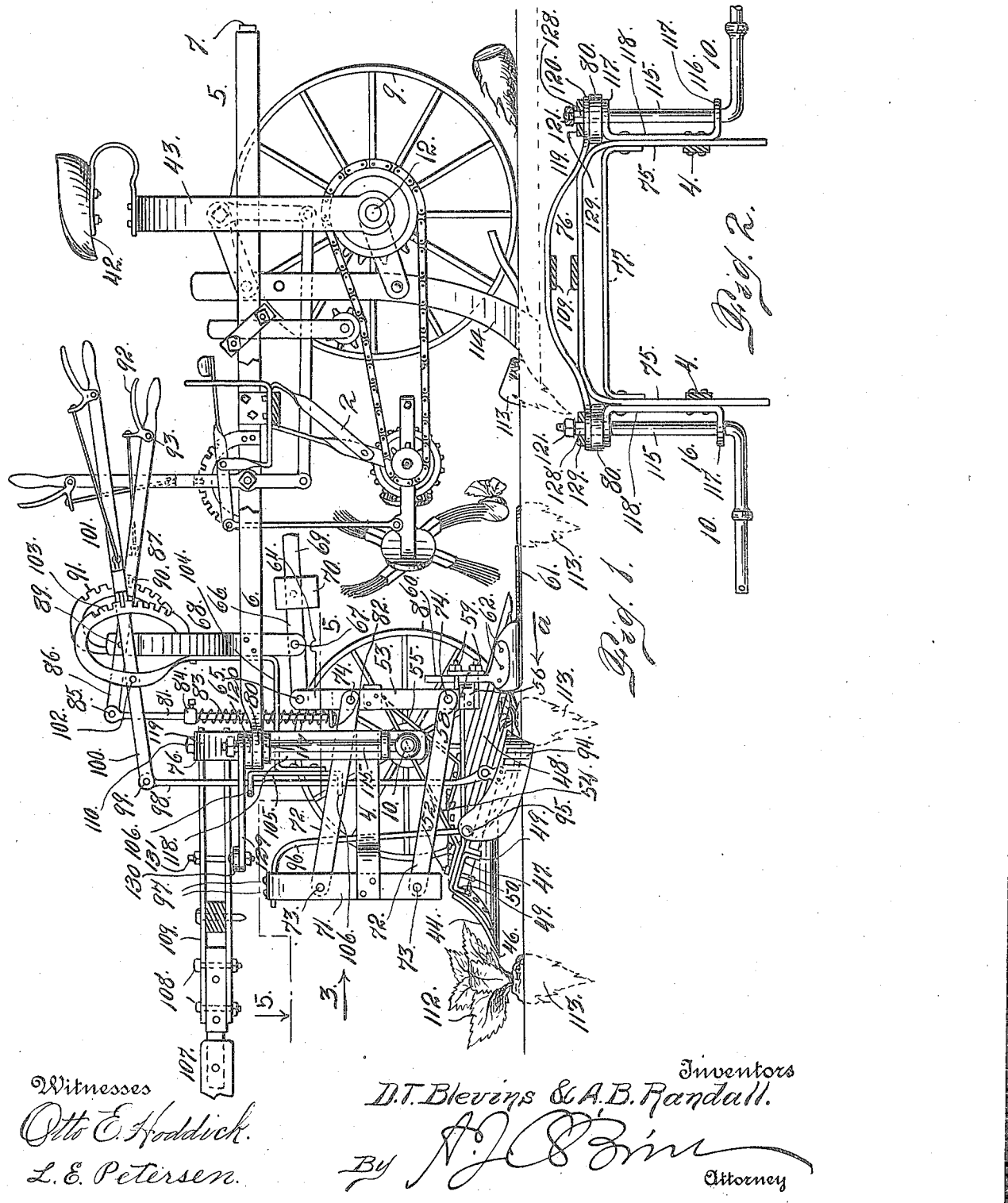

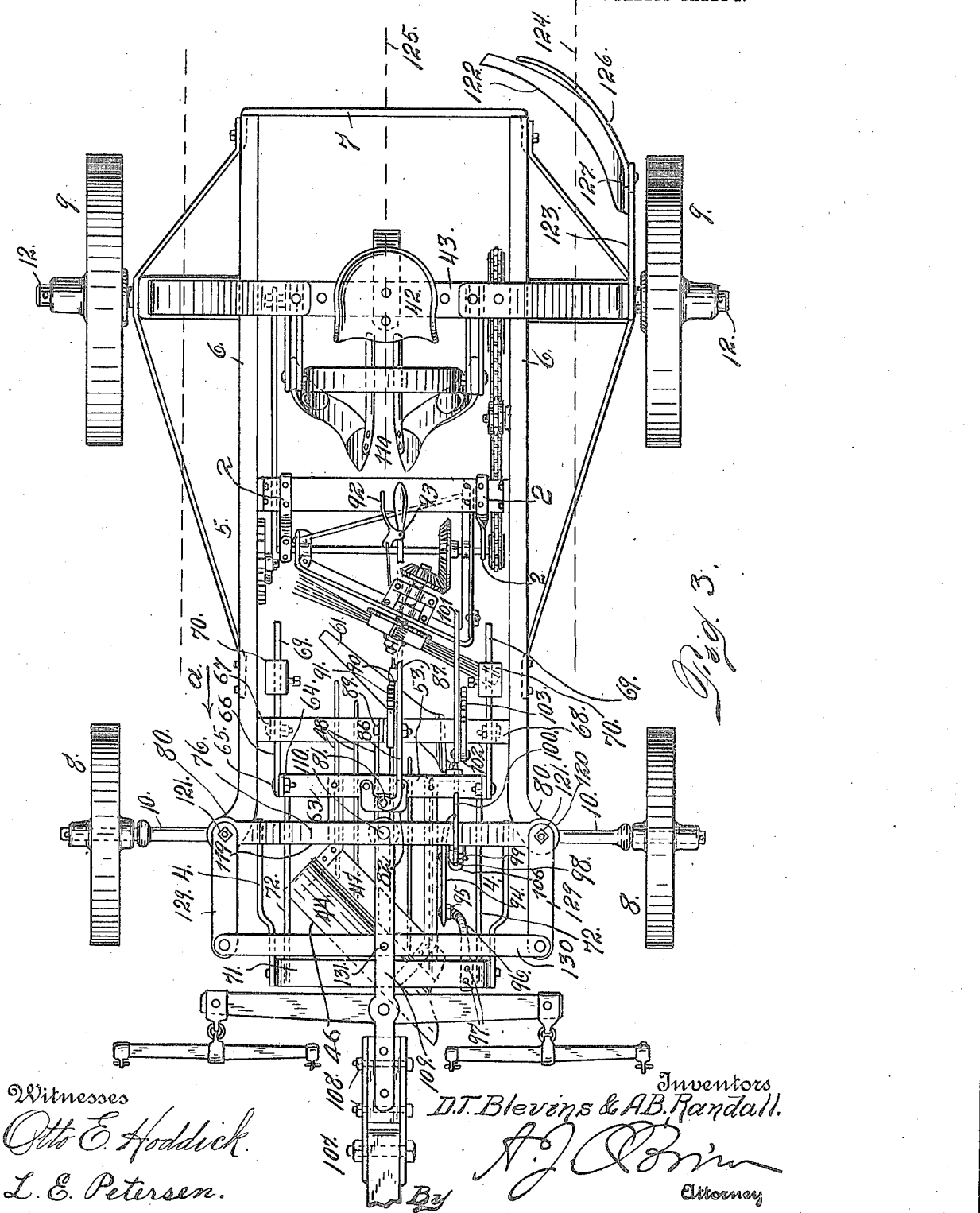

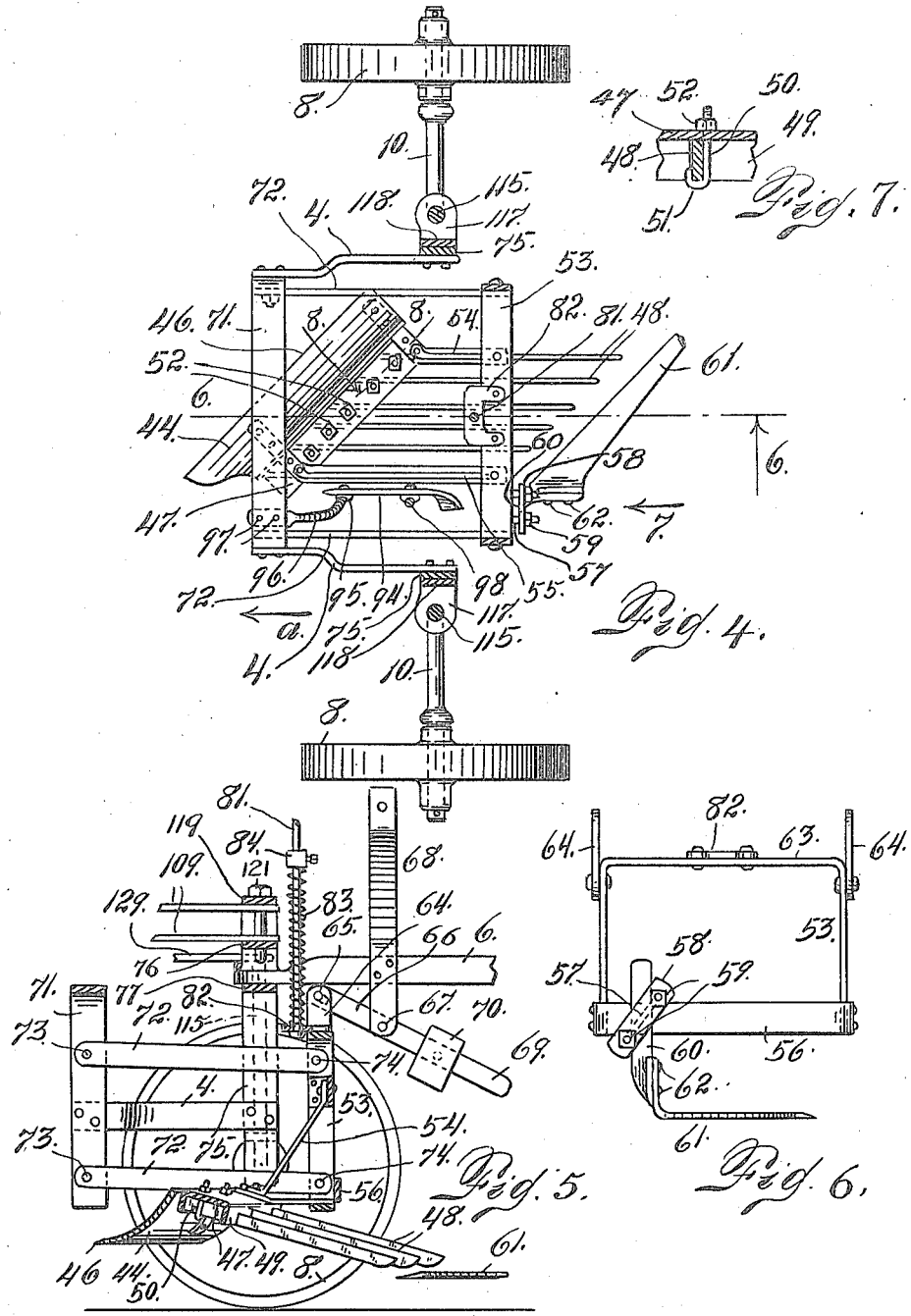

DAVID T. BLEVINS AND ALFRED B. RANDALL, OF WINDSOR, COLORADO, ASSIGNORS TO THE ACME PATENT AND DEVELOPMENT COMPANY, OF WINDSOR, COLORADO, A CORPORATION OF COLORADO.

BEET-TOPPER.

1,135,988.  Specification of Letters Patent.  Patented Apr. 20, 1915.

Application filed December 2, 1913. Serial No. 804,155.

*To all whom it may concern:*

Be it known that we, DAVID T. BLEVINS and ALFRED B. RANDALL, citizens of the United States, residing at Windsor, county of Weld and State of Colorado, have invented certain new and useful Improvements in Beet-Toppers; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in beet toppers, our object being to provide a construction adapted to efficiently perform the topping function, with reference to sugar beets or other similar vegetables, whose bodies are for the most part concealed within the earth, the tops projecting above, whereby they are accessible for removal by means of a suitable machine.

Our improved construction in its entirety consists of a machine adapted to perform both the topping and digging or uprooting function. In the present application however, particular attention will be directed to the mechanism for topping the beets, while a separate application Serial No. 804,154, filed December 2, 1913, covers the novel features of the mechanism for performing the uprooting function.

The machine is constructed to be drawn across the field by a pair of horses, the vehicle being arranged to straddle the row of beets, the tops of which are to be removed.

The topping mechanism is so arranged that an auxiliary device removes a large portion of the top of each beet and carries the same laterally beyond the path of the row of beets; while the knife which completes the topping function is located somewhat in the rear and is mounted upon a frame which is provided with a number of fingers which are located in advance of the knife, whereby the latter is maintained in the proper relative position for beet topping purposes. In the rear of this knife is arranged a rotary brush which carries portions of the beet tops removed by the knife in a lateral direction beyond the path of the row, thus preventing these tops from accumulating upon the knife and clogging the same.

Having briefly outlined our improved construction, we will proceed to describe the same in detail, reference being made in the accompanying drawing, in which is illustrated an embodiment thereof.

In this drawing: Figure 1 is a side elevation of our improved beet harvester equipped with the beet topping mechanism to which this application is directed. Fig. 2 is a front view in detail illustrating the front axle and the frame structure connected therewith, parts being shown in section. This is a view looking in the direction of arrow 3, Fig. 1, with parts omitted. Fig. 3 is a top plan view of the machine with parts removed and other parts broken away in order to better illustrate the mechanism underneath. Fig. 4 is a fragmentary detail view of the front portion of the machine to which the auxiliary and main topping elements are applied. Fig. 5 is a section taken on the line 6—6, Fig. 4, viewed in the direction of the arrow. Fig. 6 is a detail view of the main topping element, and illustrating the frame to which it is applied. This is a view looking in the direction of arrow 7, Fig. 4. Fig. 7 is a section taken through the auxiliary topper element on the line 8—8, Fig. 4, viewed in the direction of the arrow 8.

The same reference characters indicate the same parts in all the views.

Let the numeral 5 designate the framework of the machine, which includes side bars 6, connected at the rear by a transverse member 7. The framework of the machine is supported by front and rear ground wheels 8 and 9, which are connected with the front and rear axles 10 and 12.

The topping mechanism proper will now be described in detail. An auxiliary topping element 44 is located foremost upon the machine with reference to the topping mechanism. This element consists of a knife whose forward edge 46 is diagonally arranged with reference to the travel of the machine. In this description it will be assumed that the machine is traveling in the direction of the arrow *a* in Figs. 1, 3, 4 and 5. In this event, the foremost extremity of the knife 44 is located nearer the line of the row of beets than its rearmost extremity, whereby as the machine travels across the field, the portion of the edge 46 which severs the beet top is nearer the forward extremity of the diagonally arranged knife, whereby as the travel continues after the severing of a portion of the top, the latter will be directed laterally by virtue of the arrangement of the knife and carried beyond the line of the row of beets and beyond the path of the mechanism in the rear, whose function it is to complete the topping action and accomplish the uprooting operation. This auxiliary knife 44 curves upwardly as it extends rearwardly and is secured to a channel shaped bar 47 which is equipped with a number of rearwardly extending fingers 48 which as illustrated in the drawing, pass through the depending flanges 49 of the channel bar and are secured in place by bolts 50 whose lower extremities are hook-shaped as shown at 51 and to whose upper extremities nuts 52 are applied for tightening purposes. The fingers 48 are downwardly inclined and they extend rearwardly from the channel bar 47, the latter being rigidly secured to an upright U-shaped frame 53 by means of rearwardly extending metal straps or rods 54 and 55. The rear extremities of the fingers 48 terminate in a line extending diagonally to the direction of travel and parallel or approximately parallel with the direction of the arrangement of the knife 44 and the rearwardly located knife for completing the topping function as hereinafter explained. This frame 53 is equipped at its lower extremity with a transverse bar 56 to which is adjustably secured by means of a U-bolt 57, a cross piece 58 and nuts 59,—an arm 60 to which the main topping element consisting of a knife 61, also diagonally arranged with regard to the travel of the machine, is rigidly secured by means of suitable fastening devices 62. The cutting edge of the knife 61 is located in a lower plane than that of the lower extremities of the fingers 48 or the cutting edge of the knife 44.

The U-shaped frame 53 is inverted, its closed extremity being at the top and consisting of a member 63. To the upper extremity of the frame 53 are connected links 64 to whose upper extremities are pivotally connected, as shown at 65, the forward extremities of lever arms 66 fulcrumed at 67 on the vertically disposed inverted U-shaped frame 68. The parts 69 of the lever arms 66 in the rear of the fulcrum are equipped with adjustable counterbalance weights 70. By means of these weighted lever arms, the frame 53 carrying the main topping element or knife is counterbalanced, the same being free to move vertically under the counterbalancing or tension action of the weighted lever arms. Furthermore, this frame 53 is connected with a forwardly located U-shaped frame 71 by means of two pairs of parallel links 72 which are pivotally connected as shown at 73 with the frame 71 and as shown at 74 with the frame 53.

The frame 71 is rigidly supported upon the stationary framework of the machine by means of horizontally disposed arms 4 whose rear extremities are secured to the upright arms 75 of an arch shaped frame 76.

The frame 76 is provided with a transversely arranged space bar 77 whose extremities are secured to the upright arms 75. The frame 76 is provided on opposite sides near its top with perforated lugs 80 through which pass upright parts 115 of two L-shaped members 116 which constitute the front axle 10 of the machine. These L-shaped members also pass through horizontally disposed parallel parts 117 of U-shaped members 118 which are secured to the arms 75 of the frame 76. A top member 119 is arranged above the top of the arch shaped frame 76 and its extremities 120 are perforated to receive the axle parts 115, nuts 121 being applied to secure the connected members in the assembled relation. The lugs 80 of the frame 76 are located between the parts 117 and 120 when in the assembled relation (see Fig. 2 of the drawing).

In order to raise and lower the frame 53 upon which both topping elements 44 and 61 are mounted, a rod 81 is connected at its lower extremity with a lug 82 secured to the top of the frame 53. The head of this rod engages the lower surface of the lug. Surrounding the rod 81 above the lug 82 is a spiral spring 83 whose upper extremity engages an adjustable stop 84 for regulating the tension of the spring. This spring is under such tension that it normally exerts a downward stress upon the frame 53, carrying the topping elements. The said frame however, is free to vibrate vertically according as may be required in the performance of the topping function, such a vibration being necessary in view of the fact that the fingers 48 ride on the necks of the beets and as some of these necks extend farther above the ground than others, the vibration heretofore described is necessary.

In order to manually raise and lower this frame or adjust it to occupy the normal position, the upper extremity of the rod 81 is connected as shown at 85, with the forward arm 86 of a lever 87 fulcrumed at 89 on the frame 68. This lever is provided with a locking dog 90 of ordinary construction, adapted to engage a quadrant 91 suitably mounted upon the framework of the machine, the said dog being controlled by a hand piece 92 pivoted on the lever as shown at 93 in the usual manner.

In order to facilitate the topping function and prevent interference with the arm 60 which supports the main topping knife 61, due to engagement with the ground close to the beet during the topping operation, we provide an earth cutter consisting of a blade 94 which is pivotally supported at its forward extremity as shown at 95 on a bracket 96 rigidly secured to the top of the frame 71 as shown at 97. To this knife in the rear of its pivotal connection on the bracket 96 is connected a rod 98 which extends upwardly above the framework of the machine, its upper extremity being pivotally connected as shown at 99 with the forward arm 100 of a hand lever 101 fulcrumed as shown at 102 on a part of a quadrant 103 which as shown in the drawing, is mounted on the frame 68 and is also provided with an angular extension arm 104 to which is secured a guide bracket 105, the said bracket having forwardly directed parallel lugs 106 perforated to receive the rod 98, the said lugs 106 forming guides for the said rod.

The tongue 107 of the machine is connected by means of bolts 108 with the draft bar 109, the latter being centrally secured to the top of the arch shaped frame as shown at 110.

From the foregoing description the use and operation of our improved construction will be readily understood. As the machine is drawn across the field, the auxiliary knife 44 first engages the top 112 of the beet 113 and removes the greater portion of the foliage and directs the same laterally beyond the line of the row and entirely out of the way of the mechanism in the rear. The greater portion of the foliage of the beet having been removed, it is approximately in the condition indicated by the beet immediately in the rear of the foremost one in Fig. 1 of the drawing. The fingers 48 of the structure engage the neck or stump of the beet top and the main and rearwardly located topping element 61 is automatically adjusted according to the height which the body of the beet extends above the ground, whereby this knife 61 severs the neck in the proper plane.

The operator occupying a seat 42 supported on a U-shaped frame 43, which extends upwardly from the rear axle of the machine is so located that the various manually operable levers employed in the control of the machine, are all easily accessible.

A knife 122 may be connected with the rear axle of the machine by means of an arm 123, the said knife projecting inwardly across the line 124 of the row of beets adjacent the one being topped and designated by the line 125. The function of this knife 122 is to remove a portion of the foliage of the row of beets adjacent the one upon which the machine is acting and which is arranged centrally thereof as heretofore explained.

One or more fingers 126 may be arranged above the knife and connected with an upright arm 127, the latter being in turn connected with the arm 123 which extends forward and is mounted on the axle as heretofore explained.

The upper extremities of the parts 115 of the L-shaped front axle members are squared or polygonal in cross section as shown at 128 to receive openings of counterpart shape formed in the rear extremities of horizontally disposed crank arms 129 whose forward extremities are pivotally connected with the opposite ends of a transverse bar 130 which is pivoted at 131 to the draft bar 109 which is connected with the tongue 107 of the machine as heretofore explained. This mechanism makes provision for the guiding of the machine or changing its direction, since as the direction of the tongue is changed, a corresponding movement will be imparted to the forward wheels 8, as the vertically disposed parts 115 of the front axle members, in this event act as rock shafts and the horizontal parts of the axle members, as crank arms.

The machine is equipped with whiffle trees which are illustrated in Fig. 3, to which the draft animals are hitched for operating the machine.

Having thus described our invention, what we claim is:

1. In a topper for beets and similar vegetables, the combination with a main frame, supported upon ground wheels, a depending transversely arranged vertically movable frame carried by the main frame, an auxiliary knife mounted on the depending frame, fingers connected with said knife and extending rearwardly therefrom, and a second knife also attached to the depending frame and located in the rear of and in proximity to the rear extremities of the fingers.

2. In a machine of the class described, the combination with a main frame, of a depending, vertically disposed, transversely arranged, vertically movable frame carried by the main frame, an auxiliary knife mounted on the depending frame, fingers connected with said knife and extending rearwardly therefrom, a second knife also attached to the depending frame and located in the rear of and in proximity to the rear extremities of the fingers, the two knives and the rear extremities of the fingers being diagonally arranged with reference to the direction of travel.

3. In a machine of the class described, the combination with a main frame, of a depending, vertically disposed, transversely arranged, vertically movable frame carried by the main frame, an auxiliary knife mounted on the depending frame, fingers connected with said knife and extending rearwardly therefrom, a second knife also attached to the depending frame and located in the rear of and in proximity to the rear extremities of the fingers, the two knives and the rear extremities of the fingers being diagonally arranged with reference to the direction of travel, the forward edges of the knives and the line of the rear extremities of the finger being approximately parallel.

4. In a machine of the class described, the combination with a main frame, of a depending frame vertically movable, two knives mounted thereon, one in advance of the other and spaced, means for engaging the beet tops leading rearwardly from the foremost knife and terminating in a diagonal line at the rear and in proximity to the rear knife, the rear edge of the said means occupying a somewhat higher plane than the rearwardly located knife.

5. The combination with a main frame, of a depending vertically movable frame mounted on the main frame and carrying two knives, one located in advance of the other and spaced, the forward edge of the forward knife occupying a higher plane than the corresponding edge of the rear knife, means for engaging the beet tops attached to the forward knife and extending rearwardly therefrom, the rear edge of the said means being located forward of the forward edge of the rear knife and occupying a plane somewhat above that of the rear knife, the latter being vertically adjustable to regulate its position with reference to that of the rear extremity of the said means.

6. The combination with a main frame mounted on ground wheels, of a depending frame mounted on the main frame, two knives rigidly secured to the depending frame and spaced, one being in advance of the other, the forward edge of the foremost knife occupying a higher plane than the corresponding edge of the rear knife, means extending downwardly and rearwardly from the forward knife and terminating forward of the rear knife, and connected with the latter to regulate its plane of cut, the rear edge of the said means and the forward edge of the rear knife being diagonally arranged with reference to the direction of travel.

7. The combination with a main frame mounted on ground wheels, of a depending frame mounted on the main frame, two knives rigidly secured to the main frame and spaced, one being in advance of the other, the forward edge of the foremost knife occupying a higher plane than the corresponding edge of the rear knife, means extending downwardly and rearwardly from the forward knife and terminating forward of the rear knife, and connected with the latter to regulate its plane of cut, the rear edge of the said means and the forward edge of the rear knife being diagonally arranged with reference to the direction of travel, and arranged in approximately parallel relation.

8. The combination with a main frame, of a depending frame vertically movable, two knives rigidly secured to the depending frame, one being located in advance of the other, the said knives being spaced and having their forward edges diagonally arranged with reference to the direction of travel and in approximately parallel relation, the forward knife being curved upwardly and rearwardly from its forward edge, and means attached to the rear edge of the knife and extending downwardly therefrom and adapted to engage the tops of the beets after the forward knife has passed them, the rear extremity of the said means being located above the forward edge of the rear knife, the latter being vertically adjustable for the purpose set forth.

9. The combination with a main frame mounted on ground wheels, of a frame depending from the main frame and vertically movable, two knives rigidly secured to the depending frame, one being arranged in advance of the other and their forward edges being arranged diagonally to the direction of travel and approximately parallel, the forward knife extending upwardly and rearwardly from its forward edge, a bar secured to the upper and rearward edge of the forward knife and carrying fingers extending downwardly and rearwardly therefrom, the rear extremities of the fingers terminating in a diagonal line approximately parallel with the cutting edges of the two knives and in proximity to the cutting edge of the rear knife, the latter being located in a lower plane than the rear extremities of the fingers and being adjustable to regulate said relation, substantially as described.

10. The combination with a main frame mounted on ground wheels, of a vertically movable frame depending from the main frame, knives mounted on said depending frame and separated, one being located in advance of the other, the forward knife having its cutting edge in a higher plane than the corresponding edge of the rearward knife, a bar to which the forward knife is secured, the said bar extending above the cutting edge of the forward knife, fingers secured to the said bar and extending downwardly and rearwardly therefrom, whereby they are adapted to engage the necks of the beets after the forward knife has passed them, the said fingers terminating in advance of the forward edge of the rear knife and occupying a plane above the rear knife, the edges of the two knives and the line of the rear extremities of the fingers being arranged approximately in parallel relation.

11. The combination with a main frame mounted on ground wheels, of a depending frame connected with the main frame by parallel links arranged one above another to permit vertical automatic adjustment, two knives rigidly secured to the depending frame and spaced, one being in advance of the other, and means interposed between the two knives and extending rearwardly from the foremost knife to which it is rigidly secured for engaging the tops of the beets after the forward knife has passed them, the rearmost line of the said means occupying a position in advance of the forward edge of the rear knife and approximately parallel therewith, but in a higher plane, the said knife being vertically adjustable to regulate the said relation, means for manually raising the depending frame and its attachments, and a spring normally acting on the depending frame to yieldingly depress the same, substantially as described.

12. The combination with a main frame mounted on ground wheels, of a depending frame, front and rear knives rigidly secured thereto, fingers connected with the front knife and extending rearwardly therefrom, and a connection between the main frame and the depending frame to permit the knives to vibrate vertically without changing their horizontal relation.

13. The combination of a main frame mounted on ground wheels and having a depending element rigidly secured thereto, a depending frame, front and rear topping elements which are rigidly secured thereto, means for engaging the beet tops secured to the front topping element and extending rearwardly therefrom and pairs of links connecting the depending frame with the depending element of the main frame.

14. In combination, a main frame, a depending frame connected with the main frame and vertically movable, two knives rigidly secured to the depending frame and spaced, and means also rigidly secured to the depending frame and interposed between the two knives for automatically adjusting the rear knife vertically for the purpose set forth.

15. In combination, a main frame, a depending frame connected with the main frame, front and rear knives rigidly secured to the depending frame, and means also rigidly secured to the depending frame and interposed between the two knives for automatically adjusting the rear knife vertically, for the purpose set forth.

16. The combination with a main frame, a depending frame connected with the main frame, front and rear knives rigidly secured to the depending frame and fingers also rigidly secured to the depending frame and interposed between the two knives for automatically adjusting the rear knife vertically, for the purpose set forth.

In testimony whereof we affix our signatures in presence of two witnesses.

DAVID T. BLEVINS.
ALFRED B. RANDALL.

Witnesses:
J. N. AKEY,
OTTO E. HODDICK.